United States Patent [19]

Sillato et al.

[11] Patent Number: 5,177,972
[45] Date of Patent: Jan. 12, 1993

[54] ENERGY EFFICIENT AIR CONDITIONING SYSTEM UTILIZING A VARIABLE SPEED COMPRESSOR AND INTEGRALLY-RELATED EXPANSION VALVES

[75] Inventors: Stephen C. Sillato, Gahanna; Daniel B. Baer, Columbus, both of Ohio

[73] Assignee: Liebert Corporation, Columbus, Ohio

[21] Appl. No.: 565,407

[22] Filed: Dec. 27, 1983

[51] Int. Cl.⁵ .................................................. F25B 41/04
[52] U.S. Cl. .................................... 62/205; 62/228.4; 62/229; 62/505; 62/513
[58] Field of Search ................ 62/205, 206, 504, 117, 62/228.4, 229, 226, 227, 113, 228.1, 513, 505, 428

[56] References Cited

U.S. PATENT DOCUMENTS

| | | | |
|---|---|---|---|
| 2,053,945 | 9/1936 | Cowin | 62/117 |
| 2,244,312 | 6/1941 | Newton | 62/181 |
| 2,252,300 | 8/1941 | McGrath | 62/196.4 |
| 2,306,534 | 12/1942 | Freres | 62/205 |
| 2,323,408 | 7/1943 | Miller | 62/205 X |
| 2,332,981 | 10/1943 | Anderson | 62/198 |
| 2,379,286 | 6/1945 | Dobson | 62/205 |
| 2,583,178 | 1/1952 | Huntington | 62/223 |
| 3,133,424 | 5/1964 | Palmer | 62/160 |
| 3,355,906 | 12/1967 | Newton | 62/209 |
| 3,371,500 | 3/1968 | Marcus, Jr. | 62/117 |
| 3,388,559 | 6/1968 | Johnson | 62/205 X |
| 3,434,299 | 3/1969 | Nussbaum | 62/199 |
| 3,446,032 | 5/1969 | Bottum | 62/513 |
| 3,449,922 | 6/1969 | Ruff et al. | 62/160 |
| 3,499,297 | 3/1970 | Ruff et al. | 62/160 |
| 3,537,272 | 11/1970 | Hales et al. | 62/157 |
| 3,559,422 | 2/1971 | Holzer | 62/228.4 |
| 3,563,055 | 2/1971 | Owens | 62/525 |
| 3,577,743 | 5/1977 | Long | 62/212 |
| 3,584,279 | 6/1977 | Krauthamer | 318/808 |
| 3,638,446 | 2/1972 | Palmer | 62/202 |
| 3,742,722 | 7/1973 | Leinbach | 62/225 |
| 3,866,439 | 2/1975 | Bussjager et al. | 62/504 |
| 3,914,952 | 10/1975 | Barbier | 62/197 |
| 3,934,426 | 1/1976 | Jespersen et al. | 62/205 |
| 3,952,533 | 4/1976 | Johnston et al. | 62/115 |
| 3,977,205 | 8/1976 | Dreiziger et al. | 62/117 |
| 4,006,603 | 2/1977 | Miles | 62/229 |
| 4,257,238 | 3/1981 | Kountz et al. | 62/229 X |
| 4,362,027 | 12/1982 | Barbier | 62/197 |
| 4,420,947 | 12/1983 | Yoshino | 62/228.4 |

FOREIGN PATENT DOCUMENTS 111317 9/1940 Australia .......................... 62/228.4

Primary Examiner—Harry B. Tanner
Attorney, Agent, or Firm—Mueller and Smith

[57] ABSTRACT

Disclosed is an improved air conditioning system of the type having a refrigerant which sequentially flows through compressor means, condenser means in heat exchange relationship with outdoor air, expansion means, and evaporator means for the direct or indirect cooling of air in a confined space for maintaining the confined air space at a desired set point of temperature and/or humidity. The improvement for maintaining said set point of temperature and/or humidity of the confined space at variable heat loads therein and at variable outdoor air temperature comprises variable speed compressor means responsive to varying outdoor air temperature for attenuating refrigerant mass flow corresponding to lower outdoor air temperature; and expansion means responsive to attenuated refrigerant mass flow for maintaining adequate refrigerant mass flow to the evaporator means for maintaining constant the desired set point of temperature and/or humidity of the confined space at varying outdoor air temperature.

6 Claims, 4 Drawing Sheets

ENERGY EFFICIENT AIR CONDITIONING SYSTEM UTILIZING A VARIABLE SPEED COMPRESSOR AND INTEGRALLY-RELATED EXPANSION VALVES

BACKGROUND OF THE INVENTION

The present invention generally relates to air conditioning and refrigeration systems and more particularly to an air conditioning system for use in conjunction with interior confined space, which exhibits significantly improved energy efficiency at low outdoor ambient temperatures.

Air conditioning systems comprising a compressor, a condenser, expansion valve(s), and an evaporator associated in a cyclical relationship, have two basic temperature variables placed upon them to which they must respond. One variable is the load placed on the evaporator which piece of equipment is located within a confined space which is to be cooled. The second variable placed upon the air conditioning system is the outdoor ambient temperature to which the condenser is subject. While virtually all air conditioning and refrigeration systems must respond to the same outdoor ambient temperature placed upon the condenser, the evaporator loads may vary drastically depending upon the intended use of the system. For example, refrigeration systems may be utilized for maintaining frozen-food cases in grocery stores wherein extremely low temperatures must be maintained, but a subtantially constant load is placed upon the evaporator. Another example concerns air conditioning loads placed upon systems designed to maintain the temperature within large buildings. Dramatic temperature differentials between one side of the building facing the sun and the opposing side in the shade cause very great variable loads to be placed upon the evaporator.

Another class of air conditioning systems involves designs structured to maintain specific rooms or sections interiorly located of a building at a substantially constant temperature and humidity. Such systems are required, for example, to maintain proper computer room environments. These systems must be capable of recourse to variable loads placed upon the evaporator to maintain substantially constant temperature and humidity conditions within the enclosed space. While the such loads as are witnessed within computer room environments generally are normally substantially constant, the system must be effectively responsive should variable load conditions be placed upon it.

Regardless of the particular air conditioning or refrigeration system under consideration, its location in regions which are subject to distinct seasonal temperature variations can strain its performance especially during winter months when the condenser is subject to low outdoor ambient temperatures. As the outdoor ambient temperature decreases, a corresponding decrease in the head pressure from the compressor occurs. As the head pressure decreases, an adequate pressure drop across the expansion valving becomes difficult to maintain. A variety of techniques have been proposed to efficiently utilize the cold outdoor temperature in providing additional cooling capacity for air conditioning systems. Prior proposals along these lines are described, for instance, in U.S. Pat. Nos. 2,252,300, 3,977,205, 3,952,533, 3,638,446, and 3,934,426. These proposals devise various expansion valve schemes for attempting to maintain an adequate pressure drop thereacross at lower head pressures caused, for example, by decreasing outdoor ambient temperatures. Other systems utilize by-pass pumping techniques for pumping liquid refrigerant directly through an evaporator when low outdoor ambient temperatures are encountered (U.S. Pat. Nos. 2,244,312 and 3,133,424).

These latter proposals are a small step forward, though substantially reduced energy consumption does not result from their implementation. As to the former proposals relating to multiple valving systems, decreasing outdoor ambient temperatures serve to provide increasing heat removal capabilities at the evaporator. This means that such systems eventually must be shut off when the desired room temperature has been reached due to the cold outdoor ambient temperatures impressed upon the condenser. Many of these systems, then, must have the compressors turned off and on very frequently during the winter months. As a consequence, the compressors necessarily will be subject to extreme wear and their life expectancy will be decreased accordingly.

Loads typically placed on such systems as are intended for computer room or refrigeration usage and the like tend to be comparatively static. When very wide load profiles are expected, however, the art has embarked upon a vastly different avenue for solution. Such avenue has included the use of variable speed, often inverter-driven, compressors as shown in U.S. Pat. Nos. 3,355,906, 4,257,238, 4,367,237, 3,449,992, and 3,499,297. With very wide load profiles, the air conditioning system must be able to rapidly change the cooling capacity which the evaporator possesses in the circuit. The variable speed compressor, usually a centrifugal compressor, has to a large degree provided the necessary flexibility in such systems.

BROAD STATEMENT OF THE INVENTION

The air conditioning and/or refrigeration system of the present invention is designed to be extremely energy efficient and utilizes a unique combination of variable capacity compressor with integrally-related expansion components not heretofore recognized in the art.

The present invention is directed to a highly efficient air conditioning or refrigeration system of the type having a refrigerant which sequentially flows through a compressor, a condenser, expansion means, an evaporator, and then back to the compressor. The compressor serves to compress vaporous refrigerant supplied from the evaporator. The condenser condenses the refrigerant at an ambient location, i.e. in heat exchanging relationship with outdoor air, and possesses head pressure control means. The expansion means serves to expand the refrigerant from the ambiently located condenser, and the evaporator is provided in indirect or direct heat exchanging relationship with air or other suitable fluid and supplies vaporous refrigerant to the compressor. The improvement in such air conditioning system is for maintaining constant the set point of the temperature and/or humidity of the confined space or body, at variable heat loads therein, while the condenser is subjected to variable condenser temperature, e.g., due to variable outdoor air temperature. Improved efficiencies for the system are achieved through the incorporation of variable speed (i.e. capacity) compressor means responsive to varying condenser temperature, e.g. varying outdoor air temperature for attenuating liquid refrigerant mass flow during periods of lower outdoor air temperatures;

and expansion means which maintain adequate mass flow of refrigerant to the evaporator for maintaining, for example the desired set point of the temperature and/or humidity of the confined space throughout the varying outdoor air temperatures. The energy efficiency ratio of the system is improved as successively lower outdoor ambient air temperatures (i.e. condenser temperatures) are witnessed.

Another aspect of the invention resides in a method for using the above-described novel air conditioning system for maintaining constant the set point conditions of the confined space. Such improved process comprises varying the mass flow of said refrigerant with variable speed compressor means responsive to varying outdoor air temperature, and controlling the refrigerant mass flow from the expansion means into evaporator means for maintaining the energy transfer of said fluid (and, e.g., hence, the temperature and/or humidity of a confined space) constant at varying refrigerant mass flow and varying outdoor air temperature.

Unique expansion valve means are disclosed for implementing the system and process. One embodiment of the unique expansion valve arrangement comprises pressure regulator valve means connected by a refrigerant line to thermal expansion valve means which, in turn, is connected to the evaporator by a refrigerant line. The external equalizing line of the pressure regulator valve means is connected to the refrigerant line between said valve means. Such external equalizing line location provides that, during normal operation wherein the head pressure is high, the pressure regulator valve controls the pressure to the expansion valve while the refrigerant expansion valve means controls the flow through the evaporator; and that when the head pressure drops, e.g. due to a lower ambient outdoor temperature, and the mass flow in the system decreases, the pressure regulator valve opens wide so that the thermal expansion valve then controls flow through the evaporator.

Another embodiment of the expansion valve means comprises two refrigerant expansion valves which are coupled in parallel by a refrigerant line coming from the condenser and going to the evaporator, as disclosed in commonly-assigned application of Sillato et al., U.S. Ser. No. 06/704,322, filed Feb. 22, 1985. The primary valve means is a normal sized valve for the evaporator operating under normal high head pressure conditions. The secondary valve means is an oversized valve for handling the system and has its external equalizer line connected to the refrigerant line between the secondary valve means and evaporator. Such a valving arrangement permits the flow through the evaporator during periods of normal high pressure head to be controlled by the primary valve while the secondary valve remains in a closed or idle position. When the head pressure decreases due to lower outdoor ambient temperatures, and consequently the mass flow is reduced by the variable speed compressor, the primary valve opens wide and the large secondary valve then controls the flow through said evaporator.

A variation of the above parallel valve arrangement comprises replacing the secondary valve with a solenoid or motor actuated valve responsive to the suction line temperature and which is connected to said evaporator by a capillary tube which acts as an expansion valve.

The present invention advantageously achieves effective refrigeration and air conditioning which is extremely energy efficient both during normal summer time operation and during lower condensing temperatures, e.g. due to winter time operation or times during which the outdoor ambient temperature decreases. A further advantage is an improved air conditioning system which does not impose an undue strain upon the compressor or any other component of the system due to widely fluctuating outdoor ambient air temperatures and due to variable load demands. Yet a further advantage is an air conditioning system which can uniquely and precisely control the temperature and/or humidity of a confined space which is in heat exchanging relationship via a cooling fluid with the evaporator.

The above and other advantages will be readily apparent to those skilled in the art based upon the disclosure contained herein.

Figure 1:
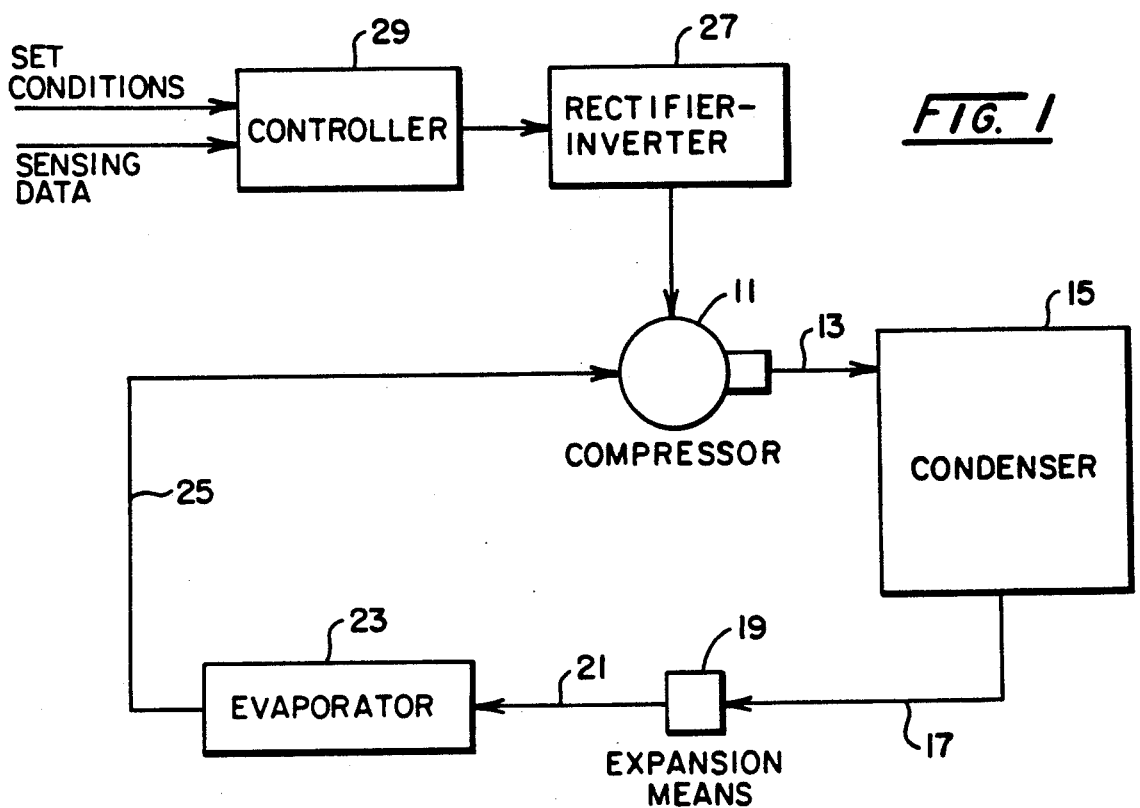
FIG. 1 is a flow diagram of the air conditioning system of the present invention.

These drawings will be described in detail below.

DETAILED DESCRIPTION OF THE INVENTION

The present air conditioning system is a unique advancement in the art which combines developments which have heretofore not been recognized as being suitable for combination for the purpose of accomplishing significantly enhanced efficiency under varying heat loads and under varying ambient conditions. Heretofore, variable speed compressors have been utilized strictly when an air conditioning system has been subject to very wide load profiles. Such systems have employed very large oversized valves to accommodate the dramatic mass flow variances caused by the varying heat loads and usually are not used for cooling during winter months. Art which has developed for improving the expansion valve capability of air conditioning systems responds to a drop in head pressure caused by decreasing ambient outdoor air temperatures normally occurring during winter months. As the head pressure decreases, the evaporator of such systems become more efficient and its ability to refrigerate improves significantly. Desired room temperature is reached readily due to the evaporator's increased efficiency which means that the compressor must be shut off so that the room temperature does not migrate below desired set point. In fact, the compressor must be shut off and restarted in a continuing cycle in order to maintain room temperature. The life expectancy of compressor so utilized is diminished substantially due to the extra strain induced by such frequent starting and stopping.

There is a substantial need in industry for an air conditioning and/or refrigeration system which takes advantage of decreasing outdoor air temperatures to significantly improve the energy efficiency ratio of the system without placing an undue strain on any of the equipment of which it is comprised. This accomplishment is achieved by the air conditioning system of the present invention through a unique combination of equipment which includes a variable speed compressor which is responsive to outdoor air temperature. The variable speed compressor is combined with expansion means which maintains an adequate mass flow to the evaporator, thus maintaining the desired temperature of the air or other fluid in the heat exchanging relationship. Several unique multiple valve arrangements for accomplishing this purpose form additional embodiments of the present invention. As disclosed in commonly assigned copending application Ser. No. 06/629,093, filed Jul. 9, 1984, now U.S. Pat. No. 4,575,668 issued Mar. 11, 1986, the air conditioning system employs a unique inverter for driving the variable speed compressor and a unique controller for monitoring and controlling the entire system.

For a proper understanding of the invention and its impact in terms of efficiency upon the air conditioning industry, an appreciation of the underlying theory of performance of the system under consideration is required. In this regard, reference is made to FIG. 1 which illustrates the basic components of the system, showing interconnection of these components. Set conditions or set point conditions can include a desired temperature and/or humidity (or range thereof) for the confined space treated by the system. These conditions and data are fed into controller 29 which monitors and controls rectifier-inverter 27. The air conditioning system comprises primarily compressor 11 which compresses a vaporous refrigerant to a higher pressure state which pressurized refrigerant flows from compressor 11 through line 13 to condenser 15. Condenser 15 is located outdoors in heat exchanging relationship with the outdoor air and thus is subject to influence of ambient air temperatures. Condenser 15 causes the refrigerant from compressor 11 to condense to its liquid phase with corresponding heat removal being provided typically to the outdoor air by means of heat exchanging fins or other conventional heat-exchanging surfaces typically having outdoor air blown across such surfaces; although a variety of additional arrangements known in the art are practical (e.g., water, glycol, or other fluid cooled condensers). Condensed refrigerant from condenser 15 flows through line 17 and into expansion means 19 which typically has been a thermal expansion valve. The pressure of the refrigerant exiting compressor 11 and entering expansion means 19 is known as the "head pressure" in the art and is substantially the same pressure throughout this portion of the air conditioning circuit. Pressure of the refrigerant exiting expansion means 19 in line 21 is dropped and the lower pressure mass flow of refrigerant into evaporator 23 causes a substantial amount of heat to be absorbed by the refrigerant.

A conventional evaporator has a fan or other arrangement which blows air across the evaporator heat exchanging surface for cooling and/or dehumidifying purposes. Such flow of treated cold air typically is used for cooling a confined indoor space, for example a computer room. Cooling of the air by its flow across the evaporator is termed "direct" heat transfer for present purposes. "Indirect" heat transfer employs the cooling of an intermediate fluid (e.g., water, air, water/glycol mixture, etc.) which cooled fluid then is contacted with the air of the confined space for its conditioning (e.g., temperature and/or humidity). In fact, such cooled fluid may be used directly to cool a mainframe computer, e.g. by circulating the cooled fluid through the computer to absorb or dissipate heat generated by the components therein. It may be desirable to flow the refrigerant directly through the computer so that the computer (or its components) becomes the evaporator in the system. The refrigerant in its vaporous state is withdrawn from evaporator 23 and passed by line 25 for return to compressor 11. This portion of the air conditioning circuit is known as the "suction line" having a "suction pressure" in line 25 and will be referred to as such herein. Of course variable air flow across the evaporator means (or flow of other fluid therethrough for its cooling) due to variable and varying heat loads may be practiced in conventional fashion as is necessary, desirable, or convenient.

With respect to the components depicted in FIG. 1, it should be understood that a variety of arrangements thereof may be provided, for instance, in parallel, cascade, series, or additional configurations while still retaining the precepts of the present invention. That is, use of multiple compressors for achieving the variable mass flow may be desirable on occasion, but certainly is not preferred. Further, multiple condensers and/or evaporators may find utility in accordance with generally accepted practices within the air conditioning industry. The same is true with respect to a single compressor which is "variable speed". Such terminology comprehends a compressor which may be "continuously" increased or decreased in capacity or one which "stepwise" may be increased or decreased in capacity. Whether the compressor speed, and hence the refrigerant mass flow rate, is achieved via a variable capacity compressor or an inverter is not critical for the present invention to properly function, it only being necessary that the capacity of the compressor may be varied for attenuating refrigerant mass flow corresponding to lower outdoor temperatures experienced by the condenser. Thus, means for varying the speed of the compressor may include a variety of known mechanical and/or electrical and/or electronic devices as may be necessary, desirable, or convenient to the designer. It also should be recognized that the use of pumps, surge tanks, and like equipment may find use on occasion to augment or otherwise achieve special effects on various of the refrigerant flow lines depicted in FIG. 1. So long as the air conditioning (or refrigeration) system functions to attenuate refrigerant mass flow responsive to outdoor air temperature at the condenser with concomitant control of refrigerant mass flow to the evaporator by expansion means, such system is within the precepts taught herein.

In this latter regard, it should be understood that varying outdoor air temperature at the condenser may be simulated or achieved when various process cooling fluids of varying temperature are used in the condenser to condense the refrigerant. Such temperature-varying process fluids may express temperature profiles independent of seasonal temperature variations. The remaining refrigeration circuit, however, only responds to the condensing temperature variations, and not to the cause of such variations. Thus, it will be apparent that the novel air conditioning/refrigeration system will function equally effectively responsive to variable condensing temperature regardless of the phenomenon which causes such variable condensing temperature.

Refrigerant flow in the system, e.g. from condenser 15 through expansion means 19 and into evaporator 23, is not constrained to be all liquid or to be a predetermined ratio of liquid to gaseous refrigerant. The present system operates with whatever liquid or liquid/gaseous phase mixtures of refrigerant occur by virtue of control and operation of the system as described herein, i.e. varying the compressor speed and expansion means mass flow responsive to the outside air temperature (load) on condenser 15 and the indoor heat load on evaporator 23. In this way, the present invention is substantially different from and an improvement over U.S. Pat. Nos. 2,252,300 and 3,952,533 which use vaporous refrigerant in the flow to the evaporator as a means to respond to the outdoor air temperature and/or the indoor heat loads. In this connection, it should be apparent that virtually any conventional refrigerant, e.g., various Freons, may be used to advantage in the present system.

Figure 2:
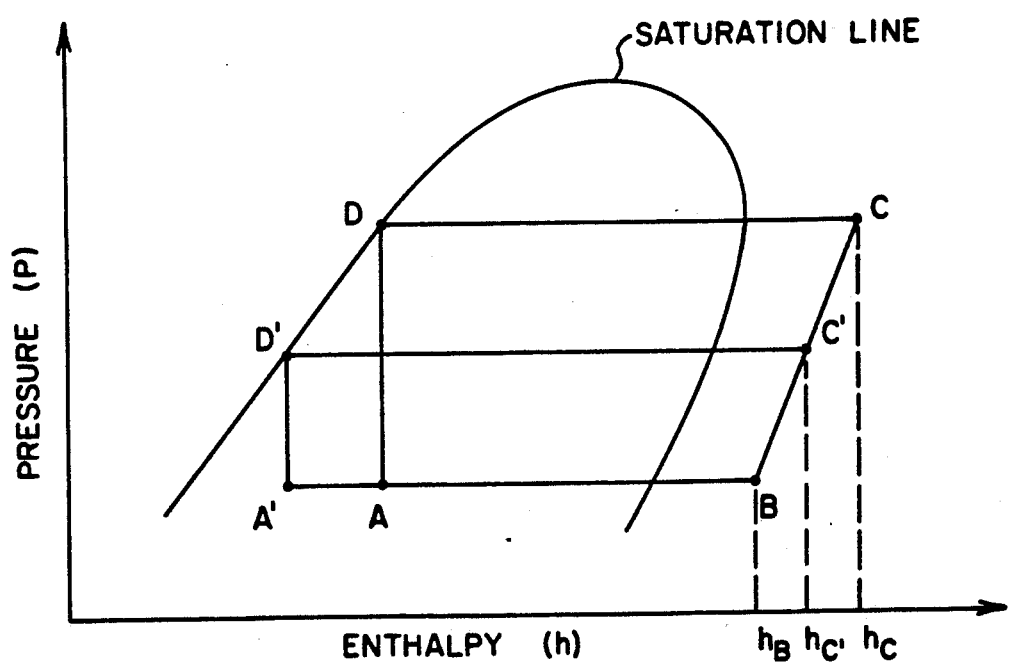
FIG. 2 is a pressure-enthalpy diagram of the air conditioning system of FIG. 1.

Referring to FIG. 2 which displays a conventional pressure-enthalpy diagram, the air conditioning system in FIG. 1 operating during normal summer seasonal conditions can be represented by lines ABCD. Segment BC of the cycle represents the function of compressor 11 wherein the pressure of the refrigerant is increased. The function of condenser 15 is represented by segment CD of the thermodynamic cycle in FIG. 2 and results in a decrease in the enthalpy of the refrigerant to a point on the saturation line corresponding with the particular refrigerant being used in the circuit. Expansion means 19 results in a pressure drop of the refrigerant as represented by segment DA. Finally, the refrigerant's transformation from its liquid phase to its vaporous phase in evaporator 23 results in an increase in the enthalpy of the refrigerant as represented by segment AB of the thermodynamic curve in FIG. 2.

During winter time operation, however, the head pressure drops due to the influence of colder outdoor air temperatures on condenser 15. Evaporators are designed for minimum pressure drops for proper operation. If the head pressure is not maintained sufficiently high for the particular evaporator in the circuit, the expansion means and evaporator will no longer function properly and room cooling will decrease. With lower pressure drops across expansion means 19 and evaporator 23, the efficiency of compressor 11 will increase dramatically. The present invention utilizes such increased compressor efficiency for a positive benefit in the overall system as will be more fully explained below. Another problem associated with colder outdoor air temperatures is the ability of expansion means 19, typically a thermal expansion valve, to control the proper mass flow through evaporator 23 due to the dropping head pressure introduced to it. Conventional air conditioning valves are designed for specific pressure drops thereacross. Unfortunately, such valves cannot fully accommodate for all head pressure conditions which normally are associated with an outdoor-located condenser 15 for proper mass flow control of refrigerant to evaporator 23.

The present invention, then, operates its thermodynamic cycle in winter following the thermodynamic cycle along lines BC'D'A' as set forth in FIG. 2. This operation is predicted upon a reduction in mass flow of refrigerant in the system which is developed at compressor 11 by rectifier-inverter 27 and associated controller 29. With reduced mass flow and properly designed expansion means 19 to accommodate the resulting lower head pressures experienced during winter time operation, the performance of compressor 11 is represented along segment BC' wherein the pressure of refrigerant is increased, though not nearly as much as is required during summertime operation. The corresponding functioning of condenser 15 results in a decrease in enthalpy of the refrigerant as expressed by segment C'D'. Expansion means 19 functions to derive a pressure drop of the refrigerant as expressed by segment D'A'. This pressure drop also is less than the pressure drop experienced during summertime operation; however, the corresponding increase in enthalpy, or cooling capacity, of the refrigerant in evaporator 23 is expressed by segment A'A. The enthalpy difference along segment A'B is more than the corresponding difference increase along segment AB. This phenomena demonstrates the increased cooling capacity of evaporator 23 during lower head pressure performance, i.e. winter, operating conditions. Of course, the amount of enthalpy gained by operation of the present invention is represented by the difference in enthalpy between summer and winter operation, i.e. the difference between point A' and point A, and the energy (or enthalpy) input to the compresor saved is the difference in enthalpy between point C' and C (i.e. $h_c$–$h_{c'}$). For a given mass flow rate of refrigerant in the system, the energy saved is a product of such mass flow rate times the difference in seasonal enthalpy values. The magnitude of such energy savings will be fully appreciated by reference to the Example which will be set forth below.

The present invention, then, is a unique marriage of a variable speed (capacity) compressor with unique expansion valve means, which combination results in a variable mass flow rate of refrigerant in the air conditioning circuit responsive to variable outdoor air temperature influence on the condenser with the associated pressure drop control across the expansion function accomplished by specific expansion valve configurations. In this regard, "expansion means" as used herein is to be construed broadly as meaning a flow restriction member. The art typically speaks of "expansion valves" in this regard and such convention is adopted herein. It should be understood, though, that any suitable pump, compressor, turbine, valve, capillary tube or other flow restriction member for achieving refrigerant expansion is included within the precepts of the present invention. Expansion means are suitable for use in the system of the present invention by permitting the refrigerant of choice to expand and, thus, effect a cooling by the evaporator. Conventional systems employ expansion means which, if subjected to variable mass flow of the present invention, would be incapable of maintaining a desired superheat or suction gas temperature. Such superheat gas temperature rise would mean less cooling was occurring and would necessitate a condition change be introduced into the system, e.g. a lower evaporator temperature, increased compressor speed, etc. Such conditions, though, would require energy input to the system which would lessen the basic energy savings advantage of the present invention. Thus, with variable speed or capacity compressor means, the expansion means must be designed for and capable of functioning under attenuated mass flow conditions and result in energy savings (the prime advantage of the present invention) at any given set point conditions which are maintained.

Considering initially the requisite valving configuration required of expansion means 19 to accommodate reduced mass flows of refrigerant and corresponding lower head pressures, expansion means 19 is responsive to the room conditions for maintaining a desired set point of temperature and/or humidity in the interior confined space being cooled and is not responsive to maintaining predetermined constant evaporator temperatures. In this regard, reference is made to the various valving arrangements shown in FIG. 3–FIG. 6. These drawings depict the segment of the air conditioning circuit commencing with line 17 from condenser 15 through evaporator 23 and suction line 25. Four different valving configurations representing expansion means 19 of FIG. 1 are depicted for accommodating the variable mass flow and variable head pressures experienced in operation of the air conditioning system of the present invention.

Figure 3:
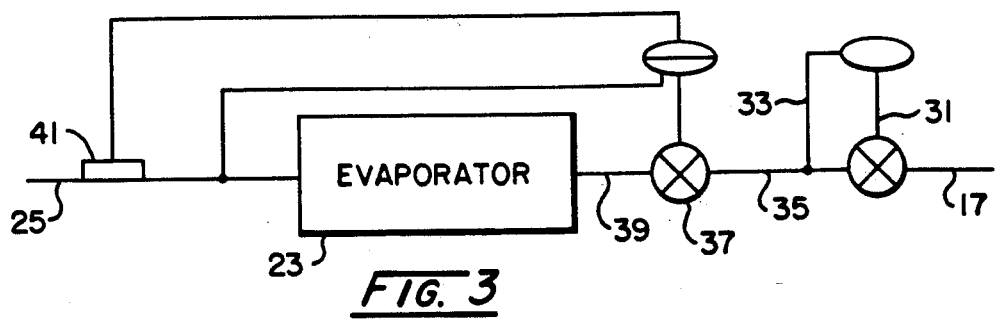
FIGS. 3 through 6 are four alternative expansion means for the air conditioning system of FIG. 1.

In FIG. 3, liquid refrigerant from condenser 15 in line 17 enters pressure regulator 31 which is a large pressure regulator valve designed for operation with a low pressure drop thereacross. Equalizing line 33 of pressure regulator 31 is connected to line 35 which is the output line of refrigerant from pressure regulator 31. The refrigerant exiting pressure regulator 31 flows from line 35 into expansion valve 37 and thence through line 39 into evaporator 23. Expansion valve 37 is a conventional thermal expansion valve which is oversized compared to a thermal expansion valve of normal design for the cooling capacity required in the air conditioning circuit. Expansion valve 37 is connected to thermal sensor 41 located on suction line 25 exiting evaporator 23. This valving arrangement is designed such that pressure regulator 31 will provide a constant pressure to thermal expansion valve 37. During normal or summer time operation when high head pressure conditions exist, pressure regulator 31 provides the control of the majority of pressure drop and expansion valve 37 does little control. With decreasing head pressure during wintertime operation and corresponding decrease in mass flow, pressure regulator 31 will open wide leaving pressure drop control to expansion valve 37 which operates in conventional fashion. External equalizing line 33 is provided in association with pressure regulator 31 such that the latter operates to provide a desired pressure at line 35 and the regulation function is, thus, self balancing. That is, pressure regulator 31 looks to see its own output pressure via external equalizer 33 and operates to maintain such pressure in line 35 constant. Pressure regulator 31 operates at variable head pressures in line 17 and independently of the evaporator temperature.

Figure 4:
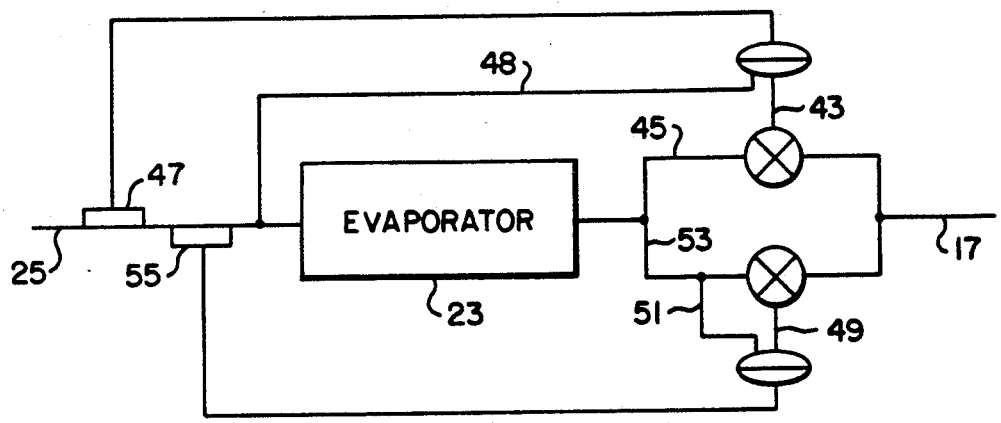

The valving arrangement in FIG. 4 (as more fully described in U.S. Ser. No. 06/704,322) is designed for performance during normal summer time operation wherein high head pressures are experienced. Under these conditions control is exercised by thermal expansion valve 43 which is conventional in size and is connected via line 45 to evaporator 23. Expansion valve 43 is a conventional thermal expansion valve which responds to thermal sensor 47 and has its external equalizer line 48 coupled for response to pressure at suction line 25. Expansion valve 49 does not operate during normal high head pressure conditions since it is oversized. During winter time operations when the head pressure in line 17 decreases, thermal expansion valve 43 will open wide and no longer provide control of superheat for evaporator 23. Accordingly, oversized thermal expansion valve 49, having its external equalizing line 51 connected to its output line 53, has sufficient capacity for providing the desired superheat for evaporator 23. Thermal expansion valve 49 is connected to sensor 55 via suction line 25 in conventional fashion.

Figure 5:
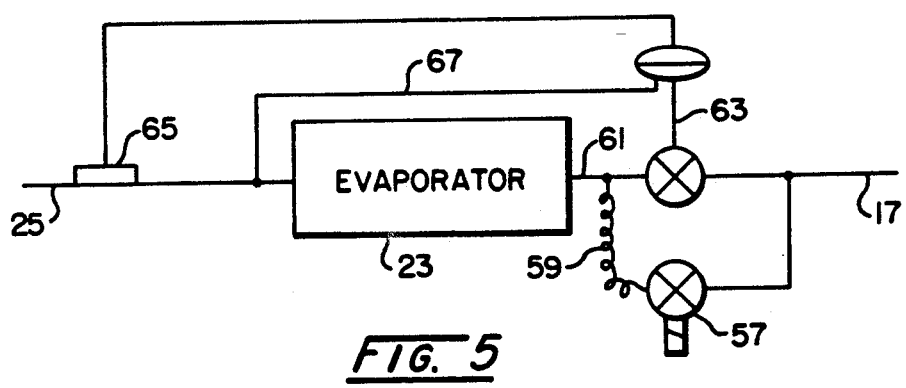

An alternative to the parallel valving arrangement of FIG. 4 is the parallel valving arrangement in FIG. 5. Referring to the latter figure, head pressure line 17 is connected to solenoid valve 57 which has an output via capillary tube 59 which enters line 61 which connects to evaporator 23. The other branch for the refrigerant from line 17 is through thermal expansion valve 63 which is connected in conventional manner to a thermal sensor 65 at suction line 25 and external equalizing line 67 extending and responsive to suction line 25. Solenoid valve 57 is actuated by a thermostat a(not shown) attached to suction line 25 such that some of the refrigerant flow is permitted to by-pass normally-sized expansion valve 63 when the latter stops controlling superheat at lower head pressure. This arrangement has the effect of "fooling" expansion valve 63 into sensing a reduced load condition and, therefore, permitting it to have enough valve stroke to control superheat at evaporator outlet 23.

Figure 6:
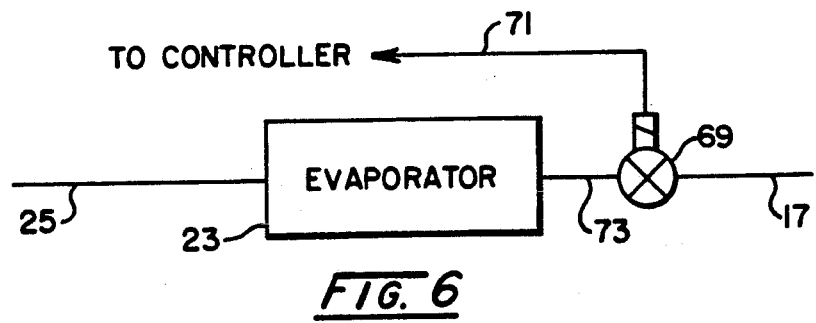

Finally, the arrangement shown in FIG. 6 provides a full range electronic valve 69 which is connected to controller 29 via line 71. Electronic valve 69 has its output connected to evaporator 23 via line 73. While such a simplified valving arrangement is distinctly preferred, present day state-of-the-art valve development has yet to achieve an electronic valve having sufficient reliability to be implemented into the air conditioning system of the present invention, though its eventual development and utilization appears only a matter of time.

While various valving arrangements have been proposed in the past to accommodate for decreased head pressures experienced during winter time operation, it should be recognized that constant compressor mass flow operation has concomitantly been called for in such proposals. As discussed above with reference to FIG. 2 and considering the thermodynamics of the evaporator function under reduced head pressure, the capacity of any system will increase dramatically during winter time operation. Where mass flows remain constant in consequence of the use of constant speed compressor, for example, in place of compressor 11 (FIG. 1), an overcooling of a confined interior space easily results. In this regard, when the air flowing across evaporator 23 would reach its desired conditions, the compressor function must be shut down, and then turned on again when additional cooling is required. The life expectancy of a compressor operating under such conditions indeed is limited.

The present invention solves such excessive compressor wear problems by providing a variable capacity compressor as compressor 11 in FIG. 1. Compressor 11 may be driven by rectifier-inverter 27 which is controlled by controller 29. Controller 29 includes a microprocessor function which has predetermined room temperature and humidity set conditions programmed therein. Appropriate sensors (not shown) in the interior confined space being cooled provide sensing data signals to controller 29 for comparison to predesired conditions. Controller 29 responds accordingly by actuating rectifier-inverter 27 to drive compressor 11 at a desired speed whereby the room conditions are maintained constant.

Additional features targeted for implementation with controller 29 include a microprocessor derived proportional speed control of compressor 11 responding to variations in temperature and/or humidity versus the set point conditions; determination of inverter degradation/failure with capacity to switch-over to line voltage operation to provide continuity of cooling and/or humidity control; and adjustment of the inverter to compensate for input voltage changes and to adjust compressor 11 speed to allow operation (e.g. partial speed) even at brown out conditions. Further features include the optimization of inverter operation to allow the compressor or motor to run at the highest possible efficiency at each speed range; control of superheat by signalling a wide range electrical or electronic expansion device; control of compressor head pressure for maximum efficiency; and control of evaporation temperature to minimize reheat requirements during a dehumidification cycle. Also, it would be desirable to detect refrigerant loss so that the system can be shut down; sense the presence of liquid refrigerant in compressor 11 for adjustment of its speed to eliminate liquid or shut off the compressor before damage occurs; and to even detect controller (microprocessor) failure for switching to line voltage operation if such failure occurs while the system is in a cooling or dehumidifying mode. It also may be possible to utilize an "overspeed" compressor (to some point past 60 Hz) to increase pulldown capabilities for dehumidification capacity. Of course, operation using 50 Hz input (e.g. European operation) is of no real consequence since sinusoidal input power is broken down and reconstructed. These and other features for controller 29 may be advisable and certainly can be developed by those skilled in such art field.

While implementation of an inverter drive for compressor 11 would appear trivial, it must be remembered that interior rooms or confined spaces to be cooled, especially computer rooms, have limited space requirements which do not readily accommodate additional equipment of the size of conventional inverters. Moreover, where such building space is already in existence, size requirements are limited by pre-existing entrance ways and doorways. The addition of an inverter to an air conditioning system merely places an additional burden on the air conditioner manufacturer to continually design smaller and smaller air conditioning packages. Whether the inverter is a conventional six-step inverter or a pluse width modulated (PWM) inverter, the electronic components therein require substantial heat sinks due to the thermal dissipation required. Heat sink requirements, then, affect size and cost requirements accordingly. As a part of the unique air conditioning system of the present invention, it has been discovered that the inverter can be dramatically reduced in size without sacrifice of its efficiency and energy requirements by placing the rectifier-inverter 27 within the conventional air flow stream across evaporator 23. Inverters the size of "a bread box" or thereabouts now are possible by such placement. This further impacts the desirability of the refrigeration or air conditioning system of the present invention by permitting the addition of the rectifier-inverter within the system without increasing the space requirements within the computer room or other confined space. While any conventional inverter may be so adapted according to the precepts of the present invention, a particularly preferred inverter is that of Baker in commonly assigned co-pending application Ser. No. 06/629,093, filed Jul. 9, 1984 now U.S. Pat. No. 4,575,668 issued Mar. 11, 1986, the disclosure of which is expressly incorporated herein by reference.

Figure 7:
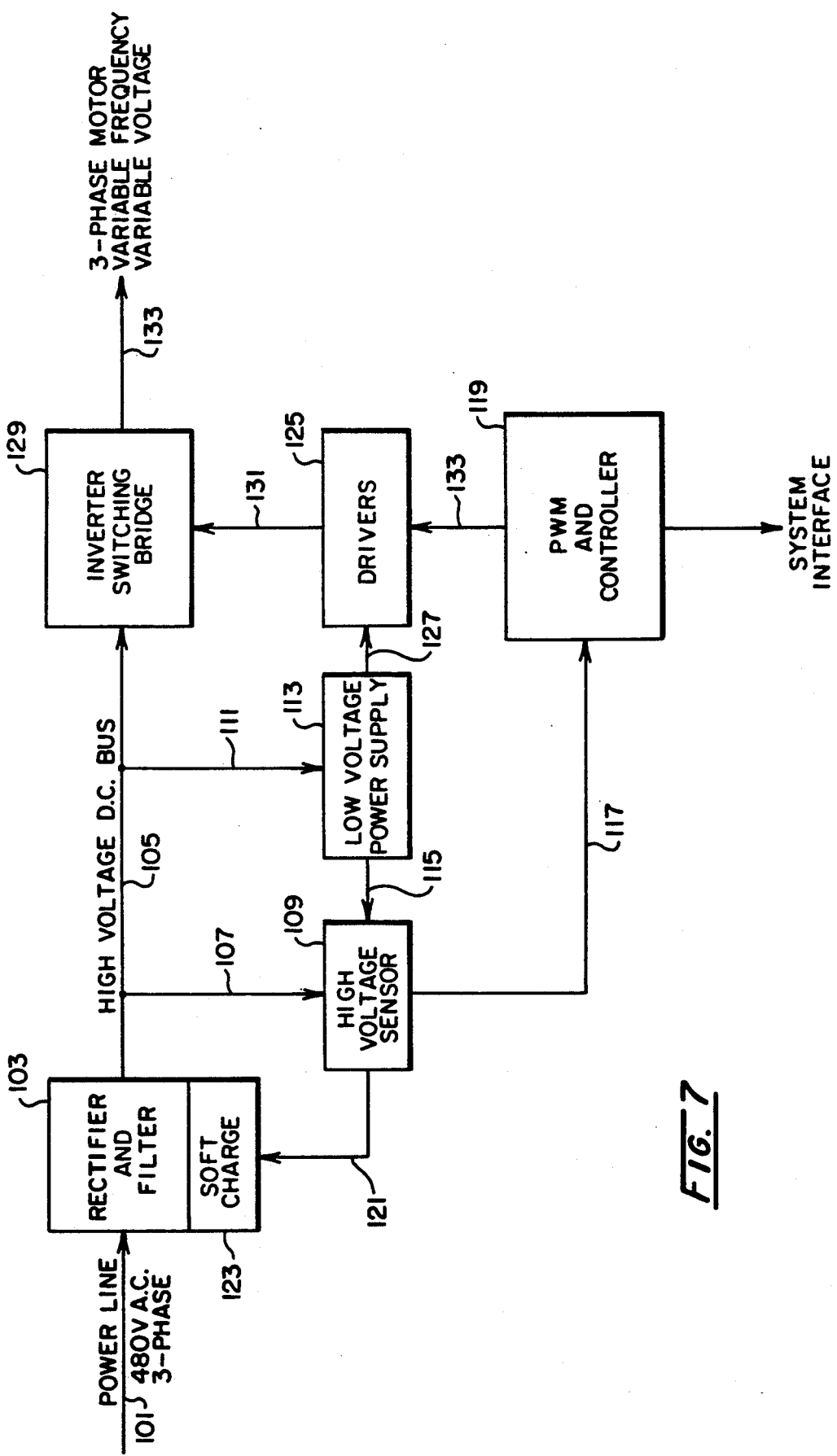
FIG. 7 is a diagram of a preferred PWM inverter for use in the air conditioning system of FIG. 1.

The preferred rectifier-inverter is briefly illustrated in conjunction with FIG. 7. Referring to FIG. 7, the rectifier-inverter is designed to operate on an input of 480 volts a.c., three-phase, entering via power lines 101 to rectifier and filter 103. Rectifier-filter 103 provides a filtered high voltage d.c. supply at line 105. Rectifier-filter 103 is designed for about 680 volts d.c. output via the latter bus 105. The voltage at bus 105 is sensed from line 107 which, in turn, leads to a high voltage sensor 109. Similarly, bus 105 is tapped at line 111 to supply power input to a low voltage power supply 113. Low voltage power supply 113 is connected via line 115 to high voltage sensor 109 to provide power for its operation. When a predetermined level of voltage at bus 105 has been reached, low voltage power supply 113 is activated as is high voltage sensor 109. When high voltage sensor 109 senses that a desired d.c. voltage is developed at bus 105, it provides a signal via line 117 to PWM (pulse width modulator) and controller 119 for activation of the system. Additionally, when adequate voltage levels are sensed by sensor 109, a signal is sent via line 121 to a soft charge function 123 which provides protection to the capacitive filters of Rectifier-Filter 103.

Low voltage power supply 113 additionally powers drivers 125 from line 127. Drivers 125 power inverter switching bridge 129 via line 131. Drivers 125, in turn, are actuated and controlled by PWM and controller 119 via line 133. From inverter switching bridge 129 is provided variable frequency and variable voltage to a three-phase motor for controlling compressor 11 via line 133. Additional components contained in the system include transient protectors (capacitors) prior to the inverter and metal oxide varisters in conventional fashion. Additionally, four bipolar power supplies are required to activate bridge 129 which supplies are a pair of high-speed field effect transistors, desirably, for providing squarewave switching. As noted above, details of the preferred inverter system is provided in the co-pending application cited above.

Figure 8:
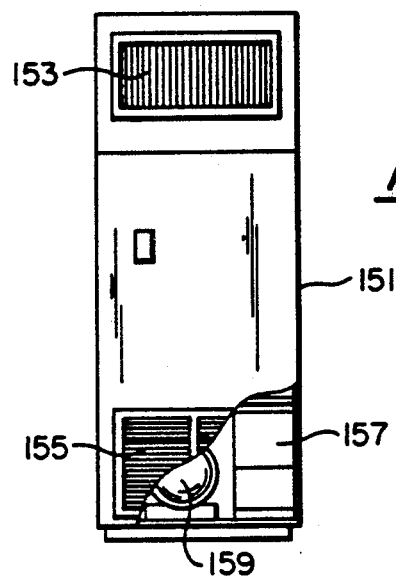
FIG. 8 is a typical air conditioner having the inverter located in the cooled air flow.

A unique achievement of providing the inverter within the flow across evaporator 23 is the ability to remarkably reduce the size of the inverter. This means that a conventional computer room air conditioner may be provided with inverter driven compressor in a package such as that shown in FIG. 8. FIG. 8 depicts conventional air conditioning unit 151 which can be found in, for example, a computer room. Air conditioning unit 151 is known as an upflow air distribution type which withdraws room air through grating 155 and exhausts cooled air to the room through grating 153. The cutaway section reveals inverter 157 and compressor 159. Inverter 157 is in the air stream for advantageous thermal tempering, i.e. heat removal. It should be understood that the particular location of equipment in FIG. 8 is illustrative and not a limitation of the present invention.

It must be recognized that in addition to the cooling provision within the air flow across evaporator 23, the inverter could be reduced in size by providing cooling from suction gas refrigerant in line 25 or by chilled water which often is provided from evaporator 23 in computer room installations. While a variety of implementations of such scheme may be envisioned, principals of operation dictate that the components requiring heat removal would be connected to a heat exchanging medium of copper or the like on one side as a heat sink connected to a source of chilled water or suction gas refrigerant on the other side. Details of implementation of such principles are within the skill of those engineers in this art field and little more detail need be provided here. Of importance, however, is the recognition that an air conditioning system has sufficient capacity inherently for the in situ cooling of the rectifier-inverter which drives compressor 11.

The energy efficiency of the air conditioning system of the present invention can be more fully appreciated by reference to the following Example which shows how the invention has been practiced but should not be construed as limiting.

EXAMPLE

A laboratory air conditioning system like that depicted in FIG. 1 and containing the parallel valving arrangement of FIG. 4 was evaluated in a laboratory environmental chamber. The compressor was a positive displacement piston-type of 31.3 cu. ft./min. at 1750 rpm; the condensor had a total heat of rejection capacity of 86,000 BTU/hr at 25° F. (difference between condensing temperature and ambient); the two thermal expansion valves had a capacity of 5 tons and 20 tons; and the evaporator had a cooling capacity of 60,000 BTU/hr. with a 2,634 CFM rated blower.

The condenser was subjected to various air temperatures to simulate varying seasonal outdoor air temperatures and the compressor speed attenuated in response thereto for maintaining the laboratory environmental room air temperature at 74°–75° F. At condenser air temperatures ranging from about 100° F. to 32° F., the confined air space temperature actually ranged from 73.9° to 75.4° F. (wet bulb temperature range of 60.8° F. to 61.3° F.).

Two load conditions were evaluated. Full load comprised an electric resistance heater of 54.267 BTU (15.9 KW load) and half load (actually 52% load) of 25.939 BTU (7.6 KW load). The evaporator fan motor provided an additional 4,608 BTU (1.37 KW) of heat load for each test for a total "100% load" test of 58,875 BTU and a "52% load" test of 30,547 BTU.

For each load condition, the energy input to the compressor was recorded so that the energy efficiency ratio (EER) could be calculated, i.e. ratio of heat load to compressor energy input expressed as BTU/watt. The following results were recorded.

TABLE 1

| Outdoor Ambient Temp. (°F.) | Energy Input to Compressor (Watt) | EER (BTU/watt) |
|---|---|---|
| 100% Load = 58,875 BTU | | |
| 95 | 5340 | 11.0 |
| 88 | 4440 | 13.3 |
| 76 | 3420 | 17.2 |
| 66 | 2700 | 21.8 |
| 58 | 2100 | 28.0 |
| 46 | 1380 | 42.7 |
| 36 | 1080 | 54.5 |
| 32 | 900 | 65.4 |
| 52% Load = 30,547 BTU | | |
| 98 | 1920 | 15.9 |
| 87 | 1560 | 19.6 |
| 78 | 1140 | 26.8 |
| 67 | 780 | 39.2 |
| 56 | 600 | 50.9 |
| 49 | 420 | 72.7 |

Figure 9:
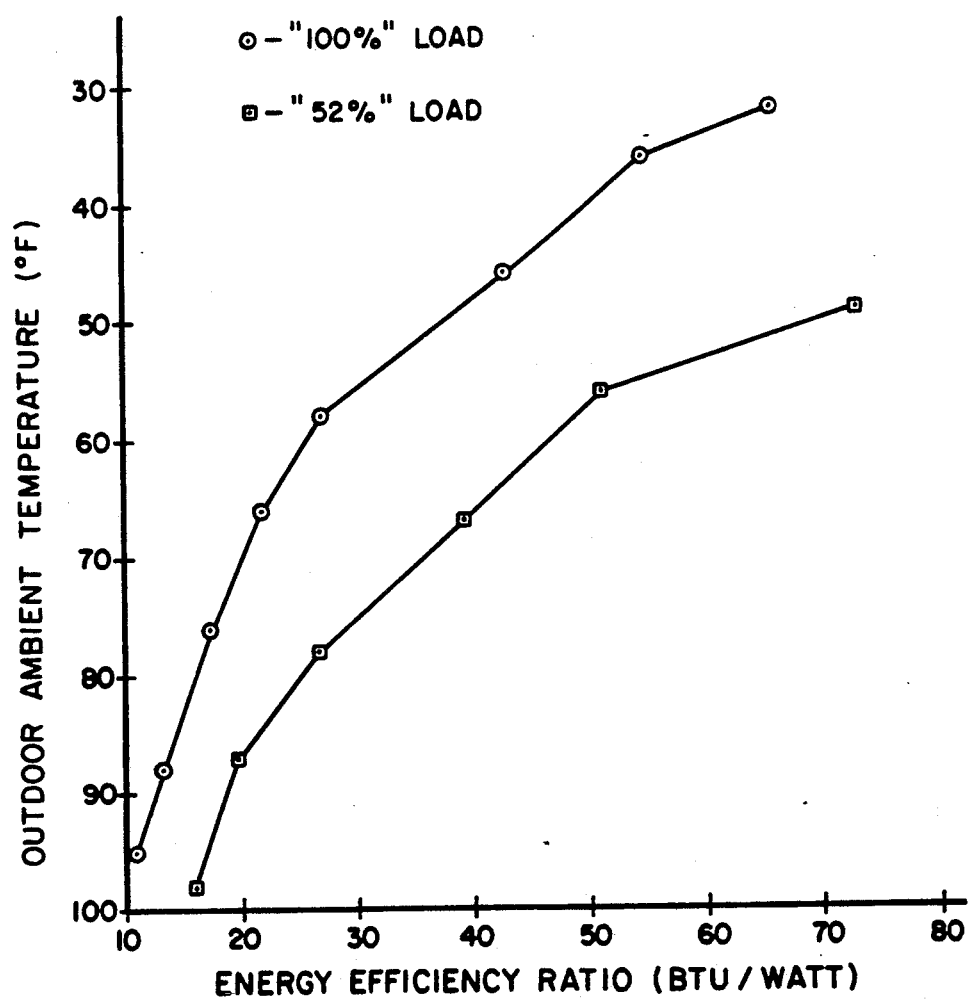
FIG. 9 depicts graphically the Energy Efficiency Ratio (BTU/watt) versus outdoor ambient air temperature obtained in actual operation of an air conditioning system embodying the present invention.

The above-tabulated data is depicted graphically in FIG. 9. These data demonstrate the improved energy efficiencies which the present invention provides while maintaining desired set point conditions of the confined space.

We claim:

1. An improved air-conditioning system of the type having a refrigerant which sequentially flows through compressor means which compresses vaporous refrigerant supplied by evaporator means, condenser means which is in heat exchange relationship with outdoor air for condensing refrigerant circulated from said compressor means, expansion means which expands liquid refrigerant from said condenser means, and evaporator means which is in contact selected from direct or indirect heat exchange relationship with air in a confined space for maintaining said confined space air at a desired set point selected from temperature, humidity, or both, said evaporator supplying said refrigerant to said compressor means, the improvement for maintaining said set point selected from temperature, humidity, or both of the confined space at variable heat loads therein and at variable outdoor air temperature without cycling said compressor means, which comprises:

sensing means for sensing a condition selected from the temperature, the humidity, or both of said confined space;

variable speed compressor means driven by a rectifier-inverter and operable to vary the mass flow of refrigerant responsive to said sensed confined space condition for maintaining said set point; and expansion means, responsive when refrigerant mass flow is attenuated, for maintaining adequate refrigerant mass flow to the evaporator means and an adequate pressure drop across said expansion means for maintaining constant the desired set point of the confined space at varying outdoor air temperature, said expansion means comprising pressure regulator valve means connected by said refrigerant expansion means which, in turn, is connected to said evaporator means by a refrigerant line, the external equalizing line of said pressure regulator valve means being connected to the refrigerant line between said valve means.

2. The air-conditioning system of claim 1 wherein the air in said confined space is directly cooled by said evaporator means.

3. The air-conditioning system of claim 1 wherein said rectifier-inverter is in indirect or direct heat exchange relationship with said evaporator means for heat removal therefrom.

4. An improved method for maintaining a confined space at a desired set point selected from temperature, humidity, or both, by conditioning the air in said space with an air-conditioning system of the type having a refrigerant which sequentially flows through compressor means which compresses vaporous refrigerant supplied by evaporator means, condenser means which is in heat exchange relationship with outdoor air for condensing refrigerant circulated from said compressor means, expansion means which expands liquid refrigerant from said condenser means, and evaporator means which is in contact selected from direct or indirect heat exchange relationship with air in a confined space for maintaining said confined space air at said desired set point, said evaporator supplying said refrigerant to said compressor means, the improvement for maintaining said set point of the confined space at variable heat loads therein and at variable outdoor air temperature without cycling said compressor means, which comprises:

sensing a condition selected from the temperature, the humidity, or both of said confined space;

varying the mass flow of said refrigerant with variable speed compressor means driven by a rectifier-inverter and responsive to said sensed confined space condition for maintaining said set point; and maintaining an adequate refrigerant mass flow to the evaporator means and an adequate pressure drop across said expansion means when said refrigerant mass flow varies for maintaining constant the desired set point of the confined space at varying outdoor air temperature, said expansion means comprising pressure regulator valve means connected by said refrigerant expansion means which, in turn, is connected to said evaporator means by a refrigerant line, the external equalizing line of said pressure regulator valve means being connected to the refrigerant line between said valve means.

5. The method of claim 4 wherein the air in said confined space is directly cooled by said evaporator means.

6. The method of claim 4 wherein said rectifier-inverter is in indirect or direct heat exchange relationship with said evaporator means for heat removal therefrom.

* * * * *